| United States Patent [19] | [11] Patent Number: 4,816,272 |
|---|---|
| Mitsuhashi et al. | [45] Date of Patent: Mar. 28, 1989 |

[54] PROCESS FOR PREPARING NOODLES AND ALIMENTARY PASTES AND PREMIXED FLOUR THEREFOR

[75] Inventors: Masakazu Mitsuhashi; Shuzo Sakai; Toshio Miyake, all of Okayama, Japan

[73] Assignee: Kabushiki Kaisha Hayashibara Seibutsu Kagaku Kenkyujo, Okayama, Japan

[21] Appl. No.: 133,813

[22] Filed: Dec. 16, 1987

[30] Foreign Application Priority Data

Dec. 20, 1986 [JP] Japan ................. 61-304693

[51] Int. Cl.$^4$ .......................... A23L 1/16; A23L 1/236
[52] U.S. Cl. .................................. 426/331; 426/555; 426/557; 426/653
[58] Field of Search ............... 426/557, 331, 555, 451

[56] References Cited

U.S. PATENT DOCUMENTS 4,495,214  1/1985  Seltzer ........................... 426/557

OTHER PUBLICATIONS

Hodge, Rendleman and Nelson, Useful Properties of Maltose, Cereal Science Today, vol. 17 No. 7, Jul. 1972, pp. 180–184, 186–188.

*Primary Examiner*—Donald E. Czaja
*Assistant Examiner*—Mary S. Mims
*Attorney, Agent, or Firm*—Browdy and Neimark

[57] ABSTRACT

Crystalline α-maltose extremely improves the stability, taste quality and shelf life of noodles and alimentary pastes, as well as decreases the addition of water in their preparation. Since crystalline α-maltose exerts an activity of binding flour, a satisfiable dough can be obtained with a reduced addition of water. In corporation of crystalline α-maltose into flour yields a premixed flour for preparing noodles and alimentary pastes, and the addition of water thereto attains an excellent dough products.

9 Claims, No Drawings

1

PROCESS FOR PREPARING NOODLES AND ALIMENTARY PASTES AND PREMIXED FLOUR THEREFOR

BACKGROUND OF THE INVENTION

1. Field of the Invention

The present invention relates to a process for preparing noodles and alimentary pastes, as well as to a premixed flour therefor.

More particularly, the present invention relates to a process for preparing noodles and alimentary pastes characterized by adding crystalline α-maltose and water to flour to prepare a dough, and shaping the dough into noodles and alimentary pastes, as well as a premixed flour containing crystalline α-maltose that facilitates the preparation of noodles and alimentary pastes.

2. Definitions

Throughout the present invention all parts and percentages are given by weight or by weight/weight.

3. Description of the Prior Art

Noodles and alimentary pastes are prepared by adding water to flour, and shaping the resultant dough into noodles and alimentary pastes.

For example, "Udon (white wheat noodle)" is prepared by adding, generally, 35–50 parts of water and a small amount of salt to 100 parts of flour, and shaping the resultant dough into noodle. Since the noodles and alimentary pastes prepared in this manner are perishable, their preservation must be improved so that they possess a higher commercial value.

In the past, hydrogen peroxide was used as a food preservative in noodles and alimentary pastes. Its incorporation is, however, prohibited because it is not advisable from safety viewpoint. Since noodles and alimentary pastes are consumed in large quantities almost every day, several methods to preserve much more safely noodle and alimentary paste have been desired and proposed.

For instance, Japanese Patent Laid-Open No. 90642/77 discloses a method wherein edible organic acids are used to improves the preservation of noodles and alimentary pastes. Japanese Patent Laid-Open No. 2647/82 and No. 29258/82 disclose methods wherein ethyl alcohol is used to improve the preservation of noodles and alimentary pastes. These methods, however, have drawbacks that they use an excessively large amount of preservative to obtain a desirable preservation and this may affect taste qualities of noodles and alimentary pastes.

SUMMARY OF THE INVENTION

In view of the foregoing, we investigated saccharides that improve preservation of noodles and alimentary pastes without affecting their taste qualities. As a result, we found that crystalline α-maltose facilitates the preparation of noodles and alimentary pastes with improved preservative and taste qualities. This is the present invention.

More particularly, the present invention relates to a process for preparing noodles and alimentary pastes, preferably, a process wherein incorporation of crystalline α-maltose reduces the amount of water used in preparation, characterized in that it comprises adding crystalline α-maltose and water, and shaping the resultant dough into noodles and alimentary pastes.

DETAILED DESCRIPTION OF THE INVENTION

In case of adding lwater to flour to prepare in conventional manner, for example, not less than approximately 32% of water against the wheat flour is required when the dough is for Udon, and not less than approximately 28% of "Kansui (a kind of aqueous alkaline containing potassium carbonate, sodium carbonate, potassium phosphate and sodium phosphate)" is required when the dough is for "Chuka-men (Chinese yellowish wheat noodle)".

The present invention is based on the finding that crystalline α-maltose exerts an activity of binding flour in the presence of water and reduces the amount of water for preparing noodles and alimentary pastes. Accordingly, the use of crystalline α-maltose in preparation of dough facilitates reduction of the amount of water to prepare noodles and alimentary pastes. This extremely facilitates the production of low-moisture-content noodles and pastes that so far have difficulty in preparation.

As crystalline α-maltose has a weak but unneglibible sweetening power, its desirable addition amount is less than 10%, preferably, 0.5–8% against flour.

Crystalline α-maltose, for example, may be a crystalline α-maltose powder as disclosed in Japanese Patent Laid-Open No. 35800/86, or that commercialized by Hayashibara Co., Ltd., Okayama, Japan, under the trade name of "FINETOSE" ®.

Noodles and alimentary pastes as referred in the present invention include Udon, "Soba (buckwheat noodle)", Chucka-men, "Kishimen (wide, long and thin wheat noodle)", "Won Ton (Chinese flour dumplings with pork, served in soup)", "Jiaoz (Chinese Fried or steamed dumplings suffed with minced meat)", "Shaomai (Chinese steamed dumplings stuffed with minced shrimp or crab,)", "Harumaki (Chinese oblong fried dumplings stuffed with minced pork or shrimp)", macaroni and spaghetti. More particularly, the present invention is favourable in preparing low-moisture-content noodles and alimentary pastes including fresh noodle, partially dried noodle, steamed noodle and boiled noodle because their stability, preservation and taste qualities are improved; as well as in preparing partially-dried, completely-dried and instant-noodles because the amount of water that must be removed in drying is reduced.

Any flour can be used in the present invention as far as a dough can be prepared therefrom. For example, one or more varieties of wheat flour, barley flour, rice flour, corn flour, "Sobako (buckwheat flour)", starch and protein flour are employable. The wording "adding crystalline α-maltose and water to flour to obtain a dough" includes any case wherein dough can be prepared from flour by using crystalline α-maltose and water. For example, crystalline α-maltose is added to flour and the mixture is kneaded with an appropriate amount of water into dough. Otherwise, an appropriate amount of water is added to flour and the resultant is kneaded with crystalline α-maltose into dough.

In the former case, for example, flour is added with less than 10% of crystalline α-maltose, preferably, 0.5–8% against the flour, to prepared a premixed flour. The premixed flour is kneaded with water into dough which is then shaped into noodles and alimentary pastes. In the latter case, flour is mixed with an insufficient amount of water and the mixture is added with the prescribed amount of crystalline α-maltose into a low-moisture-content dough which is then shaped into noodles and alimentary pastes.

Of course, a dough can be prepared by adding crystalline α-maltose together with a water to flour. The methods described above can be practiced in conventional manner without using a specific device.

In addition to tap water and well water, aqueous solutions such as saline solution, Kansiu, organic acid solution and aqueous alcohol are employable in the present invention. In the preparation of noodles and alimentary pastes, if necessary, conventional food submaterial(s) such as food preservatives, coloring agents, stabilizers, improvers, nutrients and seasonings can be used in combination with flour and/or water. In the case of preparing premixed flour, one or more varieties of these sub-materials, preferably, those in powder, can be advantageously added thereto.

For instance, edible organic acids such as acetic acid, malic acid, fumaric and lactic acid; and alcohols such as ethyl alcohol, propylene glycol and glycerin; amino acids such as glycine and alanine; salts such as common salt, acetate, citrate, sodium carbonate, potassium carbonate, calcium oxide, calcium hydroxide, calcium carbonate, dibase sodium phosphate and tribasic potassium phosphate; and natural preservatives such as garlic extract, Japanese apricot extract, fermented milk and egg white lysozyme can be used as food preservative.

It was found that by using crystalline α-maltose according to the present invention in the preparation of low-moisture-content fresh noodles, these preservative become approximately 2-5 times more effective than when used in conventional manner.

In other words, a similar preservation can be attained with a concentration of about ½-1/5 as with conventional concentrations. This facilitates the preparation of high-commercial-value noodles and alimentary pastes without care of causing alteration of their taste qualities by the preservatives.

Noodles and alimentary pastes prepared according to the present invention have the following characteristics:

(1) The addition of water can be reduced.

Crystalline α-maltose improves the activity of binding flour and its processibility. Excellent noodles and alimentary pastes can be prepared even when the addition of water is reduced. Conventional preparation of noodles and pastes wherein a relatively large amount of water is added requires a drying step prior to shaping, while the present invention requires no drying step. In preparation of partially-dried-, completely-dried and instant-noodles, the energy and time for drying can be decreased because the amount of water to be removed is less.

(2) Stable fresh noodes can be obtained.

The use of crystalline α-maltose retards the change in physical properties with the passage of day.

(3) The addition of water into noodles and alimentary pastes can be reduced, then noodles and alimentary pastes with an improved preservative quality can be prepared.

Combination with preservatives and/or improvers extremely improves these effects. Specifically, combination with preservatives improves synergistically the preservation.

(4) When fresh noodles are boiled, they can be easily floated and hardly scorch on the bottom of a pot. The yield of boiled noodles is satisfactory (5) The noodles and pastes can be heated easily, and their starch content pregelatinizes easily.

Accordingly, the time to steam and boil noodles and alimentary pastes is cut approximately by 1/5-½. This extremely shorten the cooking time for fresh noodles, partially-dried-, completely-dried- and instant-noodles, therefore is advantageous to prepare "Yonakisoba (Chuka-men cooked and served at a yatai, a roofed mobile stall with cooking facilities hawking on the streets of cities)" and "Tachiguisoba (Udon and Soba cooked and served at a yatai in a transportation station)".

(6) The Noodles and pastes are excellent in taste qualities.

The noodles and paste are excellent in appearance, texture and taste. In the preparation of boiled-, steamed- and instant-noodles, incorporation of maltose retards retrogradation of the starch ingredient in the products to prolong their shelf lives.

The following Experiments will explain the present invention.

EXPERIMENT 1

Effects of saccharides on noodles and pastes

Two thousand parts of hard wheat flour was placed in a mixer, and added with 480 parts of Kansui. The mixture was kneaded in a mixer for two minutes, and then added with 80 parts of one saccharide listed in Table I.

The resultant was kneaded for eight minutes into dough. According to conventional method, the dough was folded, aged, rolled, cut into long strips, and shaped into fresh Chuka-men. All the saccharides were compared on their processibility of flour as well as on stability and taste qualities of the Chuka-men.

As control, a Chuka-men (Control I) was prepared similarly as in the above, except that 560 parts of Kansui was mixed in place of saccharides for ten minutes. Another Chuka-men (Control II) was prepared by admixing 560 parts of Kansui and 20 parts of propylene glycol for ten minutes in place of saccharides.

As to processibility, the Chuka-mens were compared with the Controls on the adhesiveness of the dough on the roller, the homogeneity of rolled dough and the width uniformity of the noodle prepared. As to stability, the noodles were allowed to stand immediately after preparation at 5° C. over a period of 1 day or 14 days, and then compared with the Controls on extensibility, hardness and apparent springiness.

The noodles, after boiled and cooked, are compared with the Controls on appearance, palatability and taste qualities by a panel consisting of ten men and ten women.

In the Experiment, the noodles were compared with Control II using the hitherto most popular formulation, the noodles equal to Control II was graded as "Good", the noodles superior to control II was graded as "Excellent", and the noodles inferior to Control II was graded as "Passable".

The results were as shown in Table I.

As evident from the results, it was found that crystalline α-maltose exceeded other saccharids in processibility, stability and taste qualities.

EXPERIMENT 2

Effects of water on the processibility of noodles using crystalline α-maltose

Two thousand parts of hard wheat flour was added with 80 parts of crystalline α-maltose powder to prepare Chuka-men while varying the amount of Kansui from 26–18% against the wheat flour.

The processibility of the Chuka-men was evaluated similarly as in Experiment 1.

The results were as shown in Table II.

The Control in Experiment II without adding crystalline α-maltose required 28% of Kansui to obtain a passable processibility.

As evident from the results in Table II, in the Experiment wherein 4% of crystalline α-maltose against wheat flour is used, it was found that a satisfactory processibility was attained with not less than 20% of Kansui against wheat flour, specifically, an excellent processibility was attained with not less than 22% of Kansui. This reduces extremely the addition of water and improves the preservation of fresh noodles, as well as in the preparation of partially-dried-, completely-dried- and instant-noodles, facilitates the drying and/or dehydration and contributes to shorten the time to produce the noodles.

EXPERIMENT 3

Effects of crystalline α-maltose on the improvement of preservation of fresh noodles Chuka-men was prepared with 28% or 22% of Kansui and 0% or 4% of crystalline α-maltose against wheat flour together with either preservative listed in Table III. The preservative was added to the wheat flour prior to its use. The Chuka-men was compared on preservation with Control I and Control II prepared similarly as Experiment 1.

All the tests exhibited an excellent processibility. The products were investigated on preservation as follows. A fresh Chuka-men was placed on tray and then allowed to stand at 25° C. while measuring daily on viable bacterial count to determine the number of days required to reach the criterion defined by All Japan Federation of Manufactures Association (less than $3 \times 10^6$ counts/g) and also the number of days when the noodles were free of mould growth.

The results were as shown in Table III.

As evident from the results in Table III, the noodle prepared with 22% of Kansui and 4% of crystalline α-maltose was more preservative than that prepared with 28% of Kansui in conventional manner. For instance, comparison with samples of Test No. 1 and Test No. 7 revealed that incorporation of crystalline α-maltose reduced the amount of water to prepare noodles and prolonged the number of days required to reach the criterion by 2 days and the number of days when the noodles were free of mould growth by 1 day.

In case of using a food preservative, for example, ethyl alcohol, comparison with samples of Test No. 1 and Test No. 3 revealed that incorporation of 2% of ethyl alcohol prolonged the shelf life for noodle by 2 days.

This was comparable to a preservation attained by using 2% ethanal in place of crystalline α-maltose. By comparing these samples with a sample wherein 22% of Kansui and 4% of crystalline α-maltose were incorporated. Alternatively, by checking the difference in the number of days between Test No. 1 and No. 3 and that between Test No. 1 and No. 8, it can be understood that in

TABLE I

| Saccharide | Processibility | Stability | Taste | Note |
|---|---|---|---|---|
| Xylitol | Good | Passable | Passable | Control |
| Anhydrous crystalline glucose | Passable | Passable | Passable | Control |
| Crystalline glucose hydrate | Good | Passable | Passable | Control |
| Sorbitol | Good | Passable | Passable | Control |
| Crystalline α-maltose | Excellent | Excellent | Excellent | Present invention |
| Crystalline maltose hydrate | Good | Good | Good | Control |
| Anhydrous crystalline maltitol | Good | Good | Good | Control |
| Sucrose | Good | Passable | Passable | Control |
| Palatinose | Passable | Passable | Passable | Control |
| Crystalline lactose hydrate | Good | Passable | Passable | Control |
| Corn syrup powder | Good | Good | Good | Control |
| Control I | Good | Passable | Good | Control |
| Control II | Good | Good | Good | Control |

TABLE II

| Kansui (%) | 26 | 24 | 22 | 20 | 19 | 18 |
|---|---|---|---|---|---|---|
| Processibility | Excellent | Excellent | Excellent | Good | Passable | — |

TABLE III

| No. | Kansui | Crystalline α-maltose | Preservatives | Days till criterion | Days till moulds grown | Note |
|---|---|---|---|---|---|---|
| 1 | 28% | 0% | 0% | 2 days | 3 days | Control |
| 2 | 28% | 0% | Propylene glycol 1% | 3 days | 3 days | Control |
| 3 | 28% | 0% | Ethyl alcohol 2% | 4 days | 5 days | Control |
| 4 | 48% | 0% | Glycine 4% | 4 days | 3 days | Control |
| 5 | 28% | 0% | Vinegar 1% | 2 days | 2 days | Control |
| 6 | 28% | 0% | Calcium oxide 1% | 4 days | 4 days | Control |
| 7 | 22% | 4% | 0% | 4 days | 4 days | Present invention |
| 8 | 22% | 4% | Ethyl alcohol 2% | 9 days | 10 days | Present invention |
| 9 | 22% | 4% | Ethyl alcohol 1% | 5 days | 6 days | Present invention |
| 10 | 22% | 4% | Glycine 2% | 4 days | 5 days | Present invention |
| 11 | 22% | 4% | Vinegar 0.5% | 4 days | 3 days | Present invention |
| 12 | 22% | 4% | Calcium oxide 0.5% | 5 days | 5 days | Present invention | comparison with samples of Test No. 1 and Test No. 3 the shelf life was prolonged by seven days, while in comparison with samples of Test No. 1 and Test No. 8 the shelf life was prolonged by 7 days.

Alternatively, it was found that incorporation of crystalline α-maltose reduced the amount of Kansui for preparing noodles, and prolonged the shelf life of the noodles by 1-2 days, and that incorporation of ethyl alcohol without crystalline α-maltose prolonged the shelf life of noodles by two days. In addition, incorporation of crystalline α-maltose reduced the amount of Kansui, and prolonged synergistically and the shelf life by seven days in combination with ethyl alcohol.

Accordingly, it was found that the combination of crystalline α-maltose and food preservative reduced the amount of Kansui and could halved the amount of the food preservative than in case of using it in the conventional process for noodles while maintaining their preservative ability equivalent to that of the conventional products.

For instance, comparison with samples of Test No. 4 and Test No. 10 as to glycine, comparison with samples of Test No. 5 and Test No. 11 as to vinegar, and comparison with samples of Test No. 6 and Test No. 12 as to calcium oxide revealed that the food preservatives exhibited preservative ability equivalent to or more than that of conventional products even when the food preservatives were halved than that used in conventional process. This facilitated the preparation of noodles without affecting their taste qualities with food preservatives.

Several embodiments according to the invention will hereinafter be described.

EXAMPLE 1

Chuka-men

Two thousand and eighty parts of a premixed flour, prepared by the method of Example 5, was placed in a mixer, and then admixed with small amounts of coloring agents, 20 parts of ethyl alcohol and 480 parts of Kansui. The mixture was kneaded in the mixer for ten minutes into dough which was then placed in noodle processing machine and prepared into Chuka-men in usual manner.

This noodle exceeded conventional Chuka-men in processibility, stability and preservation. The time to boil the noodles was shortened approximately to ⅔ of that to boil conventional products, and the cooked noodle was tasty. The products can be favourably processed into boiled noodle or instant noodle in conventional manner.

EXAMPLE 2

Udon

Two thousand parts of medium hard flour, 40 parts of common salt, 10 parts of vinegar and 590 parts of water were kneaded for two minutes in a mixer. To the mixture was added 80 parts of crystalline α-maltose, and the resultant was kneaded for eight minutes into dough which was then placed in noodle processing machine and prepared into Udon in usual manner. This noodle exceeded conventional Udon in processibility, stability and preservation, and was processed into partially- or completely-dried-noodle. The noodle was boiled easily in less time, approximately ¾ of that to boil conventional products, and the cooked noodle was excellent in taste qualities. The products can be favourably processed into partially-dried-noodle and completely-dried-noodle in usual manner.

EXAMPLE 3

Soba

Fifteen hundred parts of Sobako, 50 parts of hard wheat flour, 6 parts of crystalline α-maltose and small amounts of coloring agents were mixed in a mixer. The mixture was then added with 1 parts of lactic acid and 61 parts of warm water, and the resultant was mixed for ten minutes into dough which was then placed in noodle processing machine and prepared into Soba noodle in usual manner. This noodle exceeded conventional Soba noodle in processibility, stability and preservation. The noodle could be boiled easily in a shortened time of 4/5 relative to that to boil conventional products. The cooked noodle was excellent in flavor and palatability. The product can be favourably processed into partially- or completely-dried-noodle in usual manner.

EXAMPLE 4

Jiaoz

One thousand parts of hard wheat flour, 15 parts of common salt, 25 parts of eggs and 275 parts of water were mixed. The mixture was added with 60 parts of crystalline α-maltose, and the resultant was kneaded for fifteen minutes to obtain a dough. After aging for thirty minutes, the dough was shaped into "jiaoz p'i (fresh dough rolled in circle for folding jiaoz's ingredients)". The jiaoz p'i was excellent in processibility, material stability and preservation, and the jiaoz cooked with the jiaoz p'i had an excellent flavor and palatability.

EXAMPLE 5

Premixed flour for preparing noodles and pastes

Two thousand parts of hard wheat flour was mixed with 80 parts of crystaline α-maltose powder. The mixture was packaged as premixed flour for preparing noodles and pastes. The premixed flour can be advantageously used to prepare noodles and pastes wherein the addition of water is reduced.

EXAMPLE 6

Premixed flour for preparing noodles and pastes

Two thousand parts of medium hard wheat flour was mixed with 60 parts of crystalline α-maltose and 40 parts of common salt. The mixture was packaged as premixed flour for preparing noodles and pastes. The premixed flour can be advantageously used to prepare noodles and pastes with a reduced addition of water.

As obvious from the above, in the preparation of noodles and alimentary pastes, incorporation of crystalline α-maltose exerts an activity of binding flour to improve its processibility, as well as facilitates the preparation of noodles and alimentary pastes having improved stability, preservation and taste qualities with a reduced addition of water.

More particularly, even noodles and alimentary pastes, prepared by using crystalline α-maltose in combination with a food preservative to reduce the addition of water, exert synergistically improved preservative ability and shelf life. In addition, the present invention realizes a premixed flour for noodles and pastes wherein crystalline α-maltose is incorporated into flour, specifically, a premixed flour which can be easily prepared into noodles and pastes with a reduced addition of water.

while preferred embodiments have been described, variations thereto will occur to those skilled in the art within the scope of the present invention concept which are delineated by the following claims.

We claim:

1. A process for preparing noodles and alimentary pastes, comprising:

adding crystalline α-maltose and water to flour to prepare a dough;

and shaping the dough into noodles and alimentary pastes.

2. The process of claim 1, wherein less than 10 w/w % of crystalline α-maltose is added to the flour.

3. The process of claim 1, wherein crystalline α-maltose is added to the flour and the mixture is kneaded with water into dough.

4. The process of claim 1, wherein a premixed flour prepared by adding crystalline α-maltose to flour is kneaded with water into dough.

5. The process of claim 1, wherein the flour is kneaded with water and the mixture is incorporated with crystalline α-maltose into dough.

6. The process of claim 1, wherein noodles and alimentary pastes are low in moisture.

7. The process of claim 1, wherein a food preservative is used in the noodles and alimentary pastes in combination.

8. The process of claim 1, wherein the prepared noodles are fresh noodles, partially dried noodles, completely dried noodles, steamed noodles, boiled noodles and instant noodles.

9. A premixed flour for preparing noodles and alimentary pastes, comprising flour and crystalline α-maltose.

* * * * *

UNITED STATES PATENT AND TRADEMARK OFFICE
CERTIFICATE OF CORRECTION

PATENT NO. : 4,816,272
DATED : March 28, 1989
INVENTOR(S) : MITSUHASHI et al.

It is certified that error appears in the above-identified patent and that said Letters Patent is hereby corrected as shown below:

On face of Patent, Under Abstract, line 9:   Delete "an"

Column 8, line 57   Delete "andpastes", insert therefor -- and pastes --

Signed and Sealed this

First Day of October, 1991

Attest:

HARRY F. MANBECK, JR.

Attesting Officer

Commissioner of Patents and Trademarks